Jan. 24, 1956   R. J. WELSH ET AL   2,731,798
GAS TURBINE PLANT, COMPRISING A ROTARY REGENERATIVE HEAT
EXCHANGER FOR THE COMBUSTION OF AIR-GAS MIXTURES OF LOW
GAS CONCENTRATION AND METHOD OF OPERATION THEREOF
Filed June 18, 1951   3 Sheets-Sheet 1

Inventors
Robert J. Welsh
Reuel D. Van Millingen
By Babcock & Babcock
Attorneys

Inventors
Robert J. Welsh
Reuel D. Van Millingen
By Babcock & Babcock
Attorneys

United States Patent Office 2,731,798
Patented Jan. 24, 1956

2,731,798

GAS TURBINE PLANT COMPRISING A ROTARY REGENERATIVE HEAT EXCHANGER FOR THE COMBUSTION OF AIR-GAS MIXTURES OF LOW GAS CONCENTRATION AND METHOD OF OPERATION THEREOF

Robert James Welsh and Reuel Duncan van Millingen, Rugby, England, assignors to The English Electric Company Limited, London, England Application June 18, 1951, Serial No. 232,116

Claims priority, application Great Britain June 23, 1950

19 Claims. (Cl. 60—59)

The invention relates to gas turbine power plants operated on a fuel consisting of low concentration of a combustible gas down to the order of ½% or even less, such as methane, found in upcast air from coal mines. Gas turbine plant of this kind as proposed hitherto had to be of a very large size for a given power output because of the low calorific value of such gas-air mixture of low gas concentration which required the negotiating of a comparatively large mass flow in order to extract a predetermined amount of energy.

It has been proposed in the case of open cycle gas turbine plants to use the cold pass of a heat exchanger as a "temperature booster" to raise the methane-air mixture to a sufficiently high temperature to achieve combustion, and to pass the combustion products back through the hot pass of the same heat exchanger to reduce that temperature to a level suitable for the operation of a gas turbine. With methane concentration below 1% the temperature rise due to combustion is, however, too low for making the resultant power output attractive in relation to the size of the necessary equipment, particularly in relation to the size of the gas turbine unit in terms of its rate of air mass flow.

It has also been proposed to increase the fuel-air ratio of such low gas concentration supplies by the addition of gaseous, liquid, or solid fuels in sufficient quantity to raise the fuel-air ratio to a value at which the power output becomes more economic in relation to the size of the plant. The addition of supplementary fuel is, however, a disadvantage as it increases the cost of operation.

It is the main object of the present invention to provide a gas turbine power plant of reasonable size for a given power output, and a method of operating the same by which such low methane concentration gas-air mixtures can be burnt without the addition of supplementary fuel. Other objects of the invention may appear later from a detailed description of some embodiments thereof.

According to a man feature of the invention an elastic fluid turbine power plane comprises an elastic fluid turbine, a compressor driven by the said turbine and supplying the same with compressed elastic fluid, a reaction chamber, a cold heat exchanger pass in indirect heat exchange with the said reaction chamber interposed between the discharge end of the said compressor and the entrance of the said turbine, a blower supplying a low methane concentration methane-air mixture to the said reaction chamber, and a rotary regenerative heat exchanger transferring heat from the exhaust gases leaving the said reaction chamber to the fresh mixture entering the same.

Preferably counterflow heat exchanger means are provided having a hot pass connected to the exhaust end of the said turbine and a cold pass connected between the discharge end of the said compressor and the entry into the cold pass of the said reaction chamber.

A by-pass line shunting across the said cold pass of the reaction chamber and comprising a regulating valve may be provided, the said valve being preferably controlled automatically by thermostat means arranged at the exit of the cold pass of the reaction chamber or in the said reaction chamber itself.

A branch inlet, with a valve, also controlled by the said thermostat for the admixture of atmospheric air to the methane-air mixture may be provided on the entrance side of the said blower.

The said reaction chamber may be surrounded by the first part of the cold heat exchanger pass of the said reaction chamber and the second part of said cold pass may be arranged inside the said reaction chamber. In order to avoid heat losses the outside of said first part of the cold pass may be lagged, or alternatively be surrounded with a mantle, through which the fresh methane-gas mixture passes on its way to the entrance into the said reaction chamber.

According to a modification of the gas turbine plant according to the invention, a second reaction chamber having a rotary regenerative heat exchanger transferring heat from its exit to its own entrance may be arranged between the exit of the cold pass of the said first reaction chamber and the entrance of the said turbine. The thermostat means controlling the valve in the said by-pass shunting the cold pass of the said first reaction chamber and the valve in the said branch inlet may then be placed between the exit of said second reaction chamber and the entrance of the said turbine.

The process according to the present invention comprises the steps of blowing a low methane concentration methane-air mixture through a reaction chamber, burning the said mixture in the said reaction chamber, transferring heat from the exhaust gases of the said reaction chamber regeneratively to the fresh gas mixture entering the same, compressing an elastic fluid, heating the compressed elastic fluid by indirect heat exchange with the reaction gases in the said reaction chamber, extracting mechanical energy from the heated compressed elastic fluid, effecting the said compressing of the elastic fluid with part of the said mechanical energy, and delivering the rest of said energy to a useful load.

According to one embodiment of the said process the elastic fluid is atmospheric air heated merely by indirect heat exchange.

According to a modified embodiment the said elastic fluid is itself a low-concentration methane-air mixture and, after being heated by indirect heat exchange with the first mentioned reaction gases, is itself burnt, with regenerative heat exchange between its combustion gases and the fresh gas mixture, before being supplied to extraction of mechanical energy as aforesaid.

Preferably a controlled part of the compressed elastic fluid is by-passed across heat exchange with the said first reaction gases, the amount of by-passed elastic fluid being preferably thermostatically controlled in dependence of the temperature of the said compressed elastic fluid before the extraction of mechanical energy therefrom.

Further features of the gas turbine power plant and of the process for its operation will become apparent later from the detailed description of some embodiments of the invention. And while we are going to describe what may be considered particularly useful embodiments both of the gas turbine power plant and of the process for its operation, we wish it to be understood that we do not limit ourselves to the exact details of construction or operation, for obvious modifications will occur to a person skilled in the art according to the particular requirements and conditions under which our invention may be used.

Figure 1:
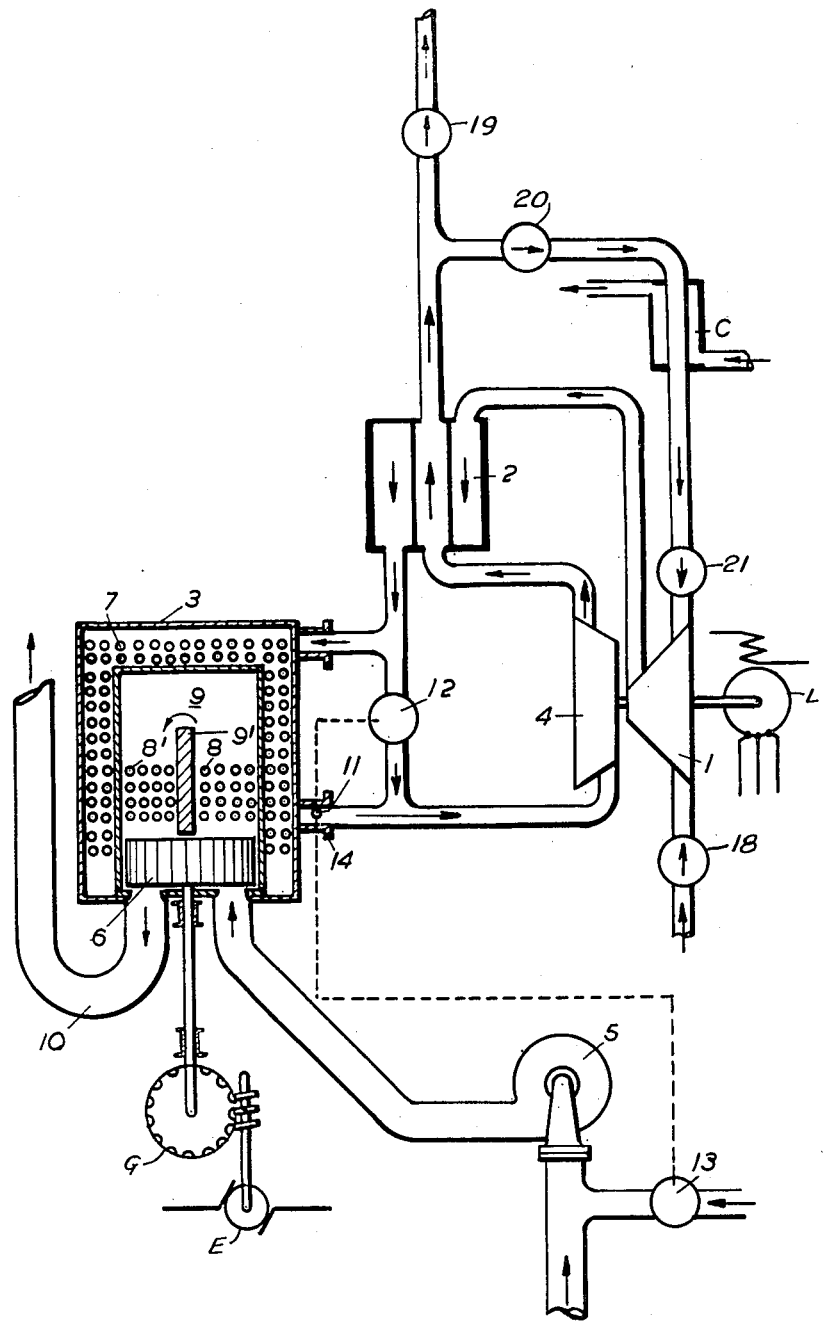
Fig. 1 shows diagrammatically one embodiment of a gas turbine power plant according to the invention.

Referring to Fig. 1, atmospheric air at a temperature of say 15° C. is passed through a valve 18 into, and is compressed in the compressor 1 whereby its temperature rises to say 250° C. It is then passed through a counterflow heat exchanger 2 whereby its temperature is raised to say 450° C. It then enters a cold heat exchanger pass consisting of the tubes 7 surrounding a reaction chamber 9 and tubes 8, 8' passed through the interior of the said reaction chamber and leaves at 14 toward the gas turbine 4 which drives the said compressor 1 and the useful load L at a temperature of say 700° C. to which it is raised by indirect heat exchange with the said reaction chamber. The exhaust from the turbine 4 is discharged through the valve 19 when open, but there is an alternative path through valve 20, cooler C and valve 21 to the inlet of compressor 1. A rotary type regenerative heat exchanger 6 is arranged at the entrance and exit of the said reaction chamber 9, so as to transfer heat from the exhaust gases of said reaction chamber to the fresh gases entering the same. The reaction chamber 9, cold pass 7, 8 and 8', and regenerative heat exchanger 6 form together a unit 3.

The upcast air, containing a low concentration of methane gas, is delivered by a low pressure fan 5 to said rotary type regenerative heat exchanger 6 at a temperature of say 20° C. and is heated thereby to say 1,000° C. at which temperature the exothermic reaction sets in. It is then passed over part 8 of cold pass tubes, and round a baffle 9' in the reaction chamber 9, where combustion is completed, after which the gases pass over a further section 8' of cold pass tubes and then at say 1,060° C. again through the regenerative heat exchanger 6, and are eventually exhausted to atmosphere through pipe 10 at a temperature of say 80° C. The cold pass tubes 8 and 8' may be protected against very high temperatures by a suitable refractory material.

The rotary regenerative heat exchanger 6 is driven by any suitable device such as, for example, an electric motor E and a reduction gearing G.

Two control units are incorporated to maintain the requisite combustion temperature in the reaction chamber 9.

A thermostat 11 in the air outlet pipe 14 from the unit 3 is pre-set for the maximum desired turbine inlet temperature. When the quantity of methane falls, tending to lower the temperature in the combustion chamber 9, the temperature of the turbine working medium issuing from pipe 14 will tend to fall also, the thermostat will then start to open a by-pass valve 12, allowing air to bypass the unit 3. The greater the fall in temperature in the combustion chamber 9, the greater will be the quantity of air by-passed through valve 12, a lesser quantity of air will thus pass through the cooling tubes 8 and 8', and less heat will be extracted from the combustion chamber, the temperature in which will consequently tend to rise.

Conversely, for an increase in the methane content the temperature in the combustion chamber 9 will rise and the thermostat 11 will then open a supplementary fresh air inlet valve 13, on the upcast air inlet pipe, thus diluting the upcast air with atmospheric air and reducing the combustion chamber temperature to the desired figure. The thermostat 11 may be replaced by a thermostat 11' in the combustion chamber 9 (Fig. 2).

If desired by closing valves 18, 19 and opening valves 20, 21, the exhaust from the turbine 4, after passing through the heat exchanger 2, may be passed through the cooler C and returned to the inlet of compressor 1. The gas turbine may then be run as a closed cycle unit and its potential output increased by raising the general pressure level of the cycle in the well known way.

Figure 2:
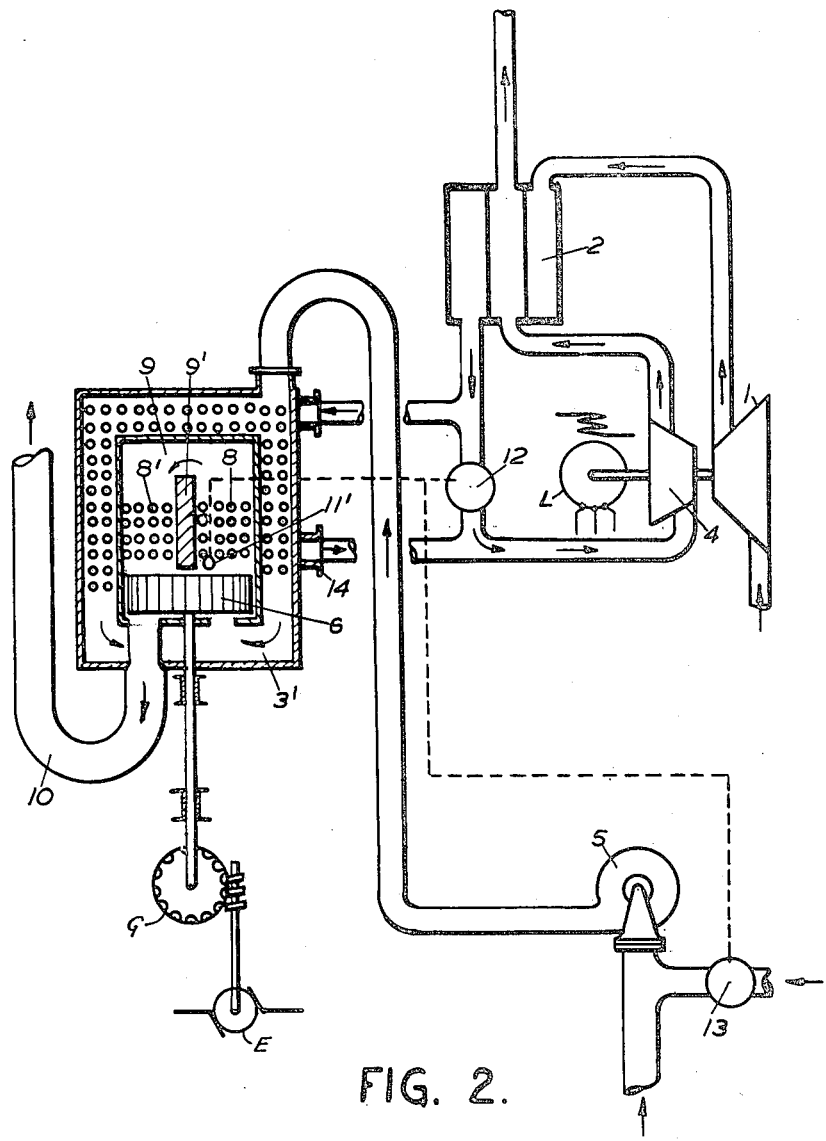
Fig. 2 shows diagrammatically a gas turbine power plant modified in some details with respect to that of Fig. 1.

Fig. 2 shows an alternative layout for the unit comprising the combustion chamber 9 and regenerative heat exchanger 6 where the upcast air from the blower 5 passes through a jacket 3' completely surrounding the unit 3 thereby reducing losses by radiation from the hot portions of the unit.

Figure 3:
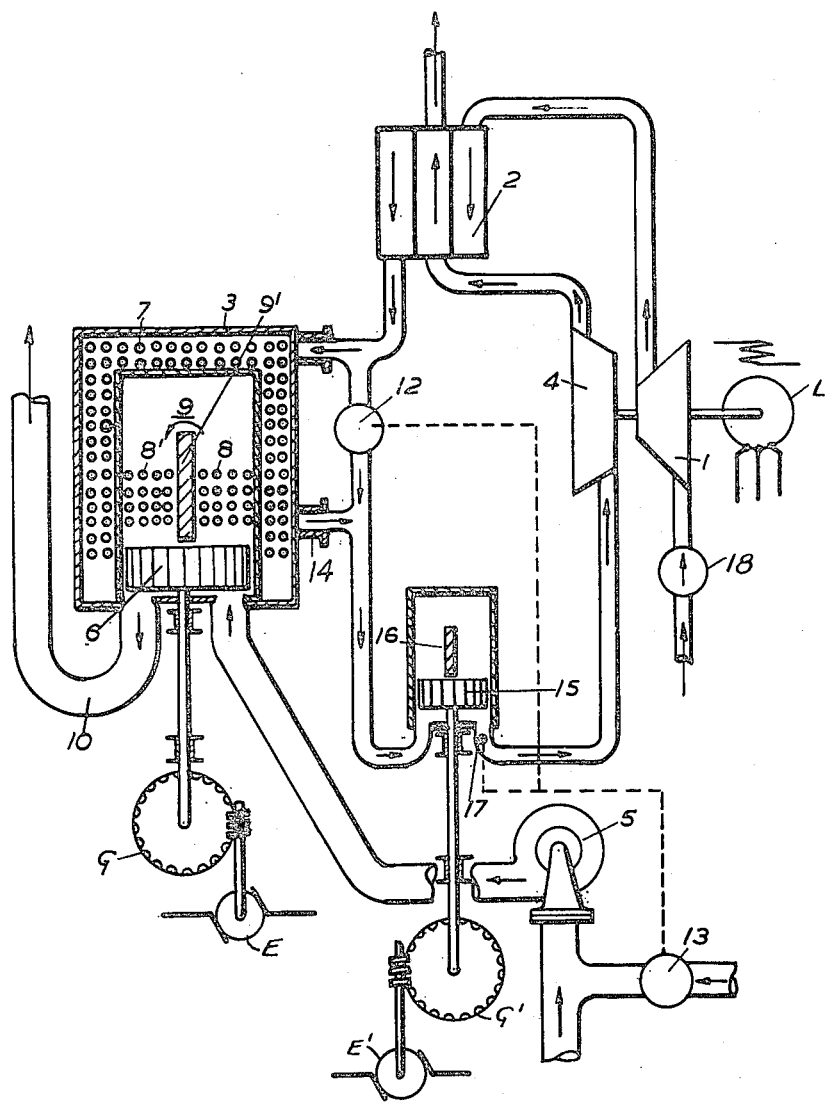
Fig. 3 shows diagrammatically a modified embodiment of a gas turbine power plant according to the invention.

Referring now to Fig. 3, the elastic fluid taken in through valve 18 by the compressor 1 is not atmospheric air but upcast air containing a small proportion of methane. A rotary regenerative heat exchanger 15 and, between the two passes thereof, a reaction chamber 16 are inserted into the pipe 14 leading the compressed mixture weak in methane from the unit 3 to the turbine 4 after having passed through the tubes 7, 8 and 8'. In the reaction chamber combustion of the mixture weak in methane is promoted and the turbine 4 operates as a gas turbine which is partly directly heated by the combustion of the mixture weak in methane compressed by the compressor 1, and partly indirectly by heat exchange with the unit 3.

The thermostat means 11 which in the embodiment according to Fig. 1 is arranged at the exit from the heat exchanger pass 8' of the unit 3 controlling the by-pass valve 12 may be replaced in the embodiment according to Fig. 3 by thermostat means 17 arranged at the entrance of the turbine 4. The rotary regenerative heat exchanger 15 is driven by an electric motor E' through reduction gearing G'.

Otherwise the construction and the operation of the arrangement according to the accompanying drawings corresponds substantially exactly to that according to Fig. 1.

What we claim as our invention and desire to secure by Letters Patent is:

1. An elastic fluid power plant comprising in combination: an elastic fluid turbine, a compressor driven by the said turbine and supplying the same with compressed elastic fluid, a reaction chamber, a cold heat exchanger pass in indirect heat exchange with the said reaction chamber interposed between the discharge end of the said compressor and the entrance of the said turbine, a blower supplying a gas-air mixture of low gas concentration, noncombustible at atmospheric temperature, to the said combustion chamber, a rotary regenerative heat exchanger transferring heat from the exhaust gases leaving the said reaction chamber to the fresh gas mixture entering the same, raising the latter to a temperature at which it becomes combustible, a by-pass line shunting across the said cold heat exchanger pass of the reaction chamber and regulating valve means arranged in the said by pass line.

2. An elastic fluid turbine power plant as claimed in claim 1, comprising in addition: a counterflow heat exchanger including a hot pass connected to the exhaust of the said elastic fluid turbine and a cold pass connected between the discharge end of the said compressor and the entry into the cold pass of the said reaction chamber.

3. An elastic fluid turbine power plant as claimed in claim 1, comprising in addition: a branch inlet connecting the entrance of the said blower to the atmosphere, and regulating valve means arranged in said branch inlet.

4. An elastic fluid turbine power plant as claimed in claim 1, comprising in addition: a branch inlet connecting the entrance of said blower to the atmosphere, regulating valve means arranged in said branch inlet, and thermostat means responsive to the temperature of the elastic fluid at the exit from the said cold pass controlling the said valve means of the by-pass line in the sense of increasing its opening with falling temperature, and controlling the said valve means of the branch inlet in the sense of opening the same with rising temperature.

5. An elastic fluid turbine power plant as claimed in claim 1, comprising in addition: a branch inlet connecting the entrance of said blower to the atmosphere, regulating valve means arranged in said branch inlet, and thermostat means responsive to the temperature in the said reaction chamber controlling the said valve means in the by-pass line in the sense of increasing its opening with falling temperature, and controlling the said valve means of the branch inlet in the sense of opening the same with rising temperature.

6. An elastic fluid turbine power plant as claimed in claim 1, comprising in addition: a return pipe connection connecting the exhaust end of the said turbine with the entrance of the said compressor, and cooler means arranged in the said return pipe connection.

7. An elastic fluid turbine power plant as claimed in claim 1, in which the said reaction chamber includes baffle means guiding the fresh gas mixture from the entrance on a prolonged path through the said reaction chamber towards the exit for the exhaust gases, and in which the said cold pass includes heat exchanger tubes passing consecutively through the part of the reaction chamber adjacent the said entrance of fresh gases and through the part of the reaction chamber adjacent the said exit for the exhaust gases.

8. An elastic fluid turbine power plant as claimed in claim 7, in which the said cold pass includes in addition: heat exchanger tubes surrounding the said reaction chamber and connected to the said heat exchanger tubes passing through the said reaction chamber.

9. An elastic fluid turbine power plant as claimed in claim 8, comprising in addition: a jacket surrounding the said reaction chamber with clearance and communicating with the discharge end of the said blower and with the entrance into the said reaction chamber, whereby the fresh gas mixture circulates about the said reaction chamber before entering the same.

10. A gas turbine plant for operation with a gas-air mixture of low gas concentration non-combustible at atmospheric temperature as a fuel, comprising in combination: a first reaction chamber, a blower supplying part of the said gas mixture to the said first reaction chamber, a rotary regenerative heat exchanger transferring heat from the exhaust gases leaving the said first reaction chamber to the fresh gas mixture entering the same and raising the latter to a temperature at which it becomes combustible, a cold heat exchanger pass in indirect heat exchange relation to the said first reaction chamber, a gas turbine, a compressor driven by the said gas turbine, supplied with another part of the said gas mixture, and delivering the same compressed to the said cold heat exchanger pass, and a second reaction chamber including a rotary regenerative heat exchanger transferring heat from the combustion gases leaving the said second reaction chamber to the fresh compressed gas mixture entering the same and raising the latter to a temperature at which it becomes combustible, the said second reaction chamber being interposed between the exit of the said cold pass and the entrance into the said gas turbine.

11. A gas turbine plant as claimed in claim 10, comprising in addition: a by-pass line shunting across the said cold pass, a regulating valve means arranged in the said by-pass line, a branch inlet connecting the entrance of said blower to the atmosphere, regulating valve means arranged in said branch inlet, and thermostat means responsive to the temperature at the entrance of the said gas turbine, controlling the said valve means of the by-pass in the sense of increasing its opening at falling temperatures and controlling the said valve means of the branch inlet in the sense of opening the same with rising temperature.

12. A process of operating an elastic fluid turbine plant with a methane-air mixture of a methane-concentration below 1% as a fuel comprising the steps of positively passing a stream of the said methane-air mixture through an exothermic reaction regeneratively transferring heat from the burnt gases leaving the said reaction to the fresh methane-air mixture raising the same to a temperature at which it becomes combustible, compressing a separate elastic fluid, transferring heat by indirect exchange from the said reaction to the said compressed elastic fluid, extracting mechanical energy from said compressed and heated elastic fluid, and using this mechanical energy partly for compressing said elastic fluid and partly for driving an external load.

13. A process as claimed in claim 12 comprising the additional steps of by-passing the said indirect heat exchange with one part of the said separate elastic fluid, automatically controlling the quantity so by-passing in response to the temperature of the other part of said separate fluid heated by said indirect heat exchange in the sense of increasing the by-passing quantity with falling temperature, admixing atmospheric air to the said stream of gas mixture, and automatically controlling the quantity of air so admixed in response to the said temperature in the sense of increasing said quantity of air with rising temperature.

14. A process as claimed in claim 12 comprising the additional steps of by-passing the said indirect heat exchange with one part of the said separate elastic fluid, automatically controlling the quantity so by-passing in response to the temperature of the said reaction in the sense of increasing the by-passing quantity with falling temperature, admixing atmospheric air to the said stream of gas mixture, and automatically controlling the quantity of air so admixed in response to the said temperature in the sense of increasing said quantity of air with rising temperature.

15. A process as claimed in claim 12, wherein the said separate elastic fluid is atmospheric air which, after the extraction of mechanical energy, is discharged back to atmosphere in an open cycle.

16. A process as claimed in claim 12, wherein the said separate elastic fluid, after the extraction of mechanical energy, is cooled, recompressed and reheated by indirect heat exchange in a closed cycle.

17. A process as claimed in claim 16, wherein the said separate elastic fluid is kept at varying superatmospheric pressure throughout its closed cycle.

18. A process of operating a gas turbine plant with a gas-air mixture of low gas concentration, non-combustible at atmospheric temperature, as a fuel, comprising the steps of positively passing a first stream of the said gas mixture through a first exothermic reaction, regeneratively transferring heat from the burnt gases leaving the said first reaction to the fresh gas mixture entering the same, raising the said mixture to a temperature at which it becomes combustible, compressing a second stream of the said gas mixture, transferring heat by indirect heat exchange from the said first reaction to the said compressed second gas mixture, subjecting the pre-heated compressed second gas mixture to another exothermic reaction, regeneratively transferring heat from the burnt compressed gases leaving said other reaction to the fresh compressed gas mixture entering the same, raising the said mixture to a temperature at which it becomes combustible, extracting mechanical energy from the said compressed burnt gases, and using this mechanical energy partly for compressing said second stream of gas mixture and partly for driving an external load.

19. A process as claimed in claim 18, comprising the additional steps of by-passing the said indirect heat exchange with one part of the said separate elastic fluid, automatically controlling the quantity so by-passing in response to the temperature of the burnt compressed gases leaving said other reaction in the sense of increasing the by-passing quantity with falling temperature, admixing atmospheric air to the said stream of gas mixture, and automatically controlling the quantity of air so admixed in response to the said temperature in the sense of increasing said quantity of air with rising temperature.

References Cited in the file of this patent

UNITED STATES PATENTS

| | | |
|---|---|---|
| 2,172,910 | Keller | Sept. 12, 1939 |
| 2,298,625 | Larrecq | Oct. 13, 1942 |
| 2,379,452 | Nettel et al. | July 3, 1945 |
| 2,457,594 | Nettel et al. | Dec. 28, 1948 |
| 2,495,604 | Salzmann | Jan. 24, 1950 |
| 2,540,598 | Ruiz | Feb. 6, 1951 |